(12) United States Patent
Kuepper et al.

(10) Patent No.: US 7,392,150 B2
(45) Date of Patent: Jun. 24, 2008

(54) ENVIRONMENTAL PARAMETER INDICATOR FOR PERISHABLE GOODS

(75) Inventors: Anton Kuepper, Kaarst (DE); Karl-Heinz Romann, Korschenbroich (DE)

(73) Assignee: 3M Innovative Properties Company, St. Paul, MN (US)

( * ) Notice: Subject to any disclaimer, the term of this patent is extended or adjusted under 35 U.S.C. 154(b) by 781 days.

(21) Appl. No.: 10/495,035

(22) PCT Filed: Oct. 22, 2002

(86) PCT No.: PCT/US02/33741

§ 371 (c)(1), (2), (4) Date: May 10, 2004

(87) PCT Pub. No.: WO03/052354

PCT Pub. Date: Jun. 26, 2003

(65) Prior Publication Data

US 2005/0021279 A1  Jan. 27, 2005

(30) Foreign Application Priority Data

Dec. 14, 2001 (EP) .................................. 01129831

(51) Int. Cl.
*G06F 15/00* (2006.01)
(52) U.S. Cl. ........................... 702/130; 236/1 C; 374/11
(58) Field of Classification Search ................. 702/170, 702/130, 183, 188, 33, 99; 374/10–11, 110; 236/1 C, 44 R, 44 A
See application file for complete search history.

(56) References Cited

U.S. PATENT DOCUMENTS

| 4,061,033 | A |   | 12/1977 | Nixon |         |
|-----------|---|---|---------|-------|---------|
| 5,173,609 | A |   | 12/1992 | Lacoste et al. | |
| 5,313,848 | A |   |  5/1994 | Santin et al. | |
| 5,426,595 | A |   |  6/1995 | Picard | |
| 5,969,606 | A | * | 10/1999 | Reber et al. | ........... 340/540 |
| 6,122,959 | A |   |  9/2000 | Hoshal et al. | |
| 6,185,513 | B1 |  |  2/2001 | Plettner et al. | |
| 2006/0228449 | A1 | * | 10/2006 | Tewari | .............. 426/129 |

FOREIGN PATENT DOCUMENTS

CN         8520005 U        12/1985

(Continued)

*Primary Examiner*—Edward Raymond
(74) *Attorney, Agent, or Firm*—Thomas M. Spielbauer

(57) ABSTRACT

An electronic device is proposed for accompanying a perishable good during one period to monitor the exposure of the good to an environmental parameter, such as temperature. The device includes a data interface for receiving data representing the exposure of the good to the environmental parameter during an immediately preceding period. It further includes a sensor for measuring the environmental parameter. Also, the device includes a processor for using a relationship specific to the good (such an Arrhenius equation for that good) to compute a characteristic of the good at the end of the one period using the received data and the output of the sensor. The device further includes a memory for recording the output of the sensor. To economise on memory usage, data is stored at a faster rate during periods when the data is of most significant (e.g. it indicates a high temperature). A switch is provided for indicating that data should not be taken into account in the computation, during a short interval, in which for example the device may be being handled.

21 Claims, 7 Drawing Sheets

FOREIGN PATENT DOCUMENTS

| | | |
|---|---|---|
| CN | 2164557 Y | 5/1994 |
| CN | 1046999 C | 12/1999 |
| FR | 2774763 | 8/1999 |
| GB | 2259768 | 3/1993 |
| WO | WO 93/08451 | 4/1993 |
| WO | WO 01/23841 | 4/2001 |

* cited by examiner

ENVIRONMENTAL PARAMETER INDICATOR FOR PERISHABLE GOODS

FIELD OF THE INVENTION

The present invention relates to a (portable) electronic device for accompanying perishable or degradable goods to monitor at least one environmental parameter to which the goods are exposed. The invention also relates to a system for and a method of monitoring the exposure of perishable goods to an environment parameter.

BACKGROUND OF THE INVENTION

Temperature monitors are important in any industry involving goods that are temperature sensitive. This includes such broad categories as food and beverages, medical and pharmaceuticals, biologicals, chemicals and adhesives. The monitoring of the environment of goods is also important to distributors, suppliers, storage facilities, or large service providers such as hospitals or large restaurant chains.

Certain perishable goods require low temperature for their conservation during storage as well as during transportation. In case of a rupture of the cold chain, such goods typically must be used quite rapidly in a period of a few hours. Food products, such as meat or dessert cream, are typical examples, but this constraint can also apply to other products, such as blood components. For example, red cell concentrates, which may be conserved in a blood bank 42 days at +4° C. once distributed by the blood transfusion facility, must be used very rapidly if the ambient temperature exceeds +10° C. Other temperature sensitive products, such as water-based adhesives, water-based inks, Al-based vaccines, anesthetics, or organs for transplant purposes, need to be maintained above certain temperatures or within a certain range temperature to assure viability.

To date one type of commercial temperature monitoring device exists, which is based on chemical or colored ink markers. Such devices typically either work as a threshold-indicator undergoing a sudden color change at a given temperature or run continuously in a narrow band system which is progressively colored as a function of time and temperature.

Other commercially available temperature monitoring devices include data loggers or recorders. Such loggers, after being turned on, collect at regular time intervals temperature data, which are stored in the memory of the device. At the end of the monitored period, the data can be downloaded over an interface to a computer or an external read-out device or display.

Products or goods may also be sensitive to other environmental conditions. For example, red blood cells of blood products burst under exposure of certain levels of acceleration or shock. Alternatively thrombocytes in the blood require constant motion to prevent clotting and/or coagulation of the product.

Electronic monitoring devices, which fall in the general category of data loggers, have been described in WO 93/08451, U.S. Pat. No. 6,122,959 and U.S. Pat. No. 5,426,595 for monitoring temperature, pressure, humidity and/or acceleration (i.e. shock or vibration).

FR 2,774,763 describes an electronic device for estimating the amount of heat received by a product for a given period. The described device measures at regular intervals the temperature to which the product is exposed, and the measured temperature is converted according to a specific mathematical algorithm into a coefficient. The device includes means for recording the converted coefficients and cumulating these coefficients in a memory, as well as means for transmitting the cumulative coefficient in the device memory to an adapted external reader. The cumulative coefficient represents an estimate of the heat amount to which the product was exposed during the monitored period. A high cumulative coefficient would indicate that the product was generally exposed to higher temperatures while a low cumulative coefficient would indicate a general exposure to lower temperatures (although a brief exposure to a high temperature during the monitored period could not be ruled out by a low cumulative coefficient).

WO 01/23841 describes a monitoring device in which time and one or more parameters are continuously measured over one time period after triggering of a start signal and the important chronological parameter conditions in regard to storage and transport conditions are simultaneously and permanently displayed on an integrated display. The described device may include a program, which would allow the calculation and display of the expired storage or transport time and/or remaining storage or transport time under normal expiry time and/or remaining storage or transport time as reduced through measured parameter conditions during that time period.

SUMMARY OF THE INVENTION

It has been found that the above-described monitoring devices are disadvantageous in that they provide information about the exposure only and/or provide information in regard to the period of time only that they monitored.

It is to be appreciated during the lifetime of perishable goods starting from production or product origin to its final use, such goods are often repeatedly divided into smaller entities or batches of goods due to e.g. (re)packaging, distribution or division of cargo or shipping units. If, prior to any such sub-division, the goods were being monitored with a monitoring device, in order to continue monitoring at least a part of the goods need to be re-tagged with a new monitoring device. Upon re-tagging with a new monitor device, the data representing the exposure of the goods to the environmental parameter or parameters of the previously monitored period are lost. Thus, it has been found there is a need to provide a monitoring device and a monitoring system therefor, which would allow the monitoring of substantially the complete lifetime of a perishable good and at the same time allow re-tagging of such a good as needed or desired. The provision of such a monitoring device and system is also desirable because with a detailed knowledge of substantially the complete environmental parameter history, safety margins or expiration dates as well as the allocation of remaining lifetime of the monitored good may be defined much more precisely.

In a first aspect the invention proposes in general terms that a perishable good is accompanied, during a certain period of its life, by an electronic monitoring device.

The device is provided with data representing the exposure of the good to the environmental parameter before this period, and the device includes a sensor for measuring the environmental parameter during the period. The device uses a relationship specific to the good to compute a characteristic of the good at the end of the period, using the provided data and the output of the sensor.

Specifically, this first aspect of the invention may be expressed as an electronic device for accompanying a perishable good during one period to monitor the exposure of the good during that one period to at least one environmental parameter, the device comprising:

a) data import means for importing first data representing the exposure of the good to the at least one environmental parameter during an immediately preceding period;
b) sensor means for generating second data representing the exposure of the good to the at least one environmental parameter during said one period;
c) processing means for computing a good-specific characteristic at the end of said one period using the first and second data and a good-specific relationship between the characteristic and the parameter; and
d) output means for outputting the characteristic.

The terms "import" and "export" are used in this document to refer to data transfer in a machine-readable form, such as by a coded electric or electromagnetic signal. The term "output" is used here to include export of data, and also to include display of data to a user. The output means of the device preferably includes both display means and data export means. The import/export devices may comprise an antenna, and/or an optical detector, and/or an electric contact, and/or an (ultra) sound detector or equivalents. An ultrasound transmission may be useful in cases when electromagnetic radiation is strongly damped or reflected by the goods or their containers (so that an electromagnetic transmission is not convenient) or is not allowed.

The good-specific characteristic may be a characteristic (here referred to as "expiry data") relating directly to an expiry of the good, such as an expected expiration date, remaining life-time, or expired life-time (in each case assuming a set of environmental conditions, such as the present environmental conditions, continue). The present invention makes it possible to generate much more accurate expiry data than was available in the prior art, since it is based on actual storage/transportation conditions, rather than expected storage/transportation conditions.

Among the advantages of such improved expiry data are that there is more certainty that goods will be delivered in an acceptable form, so that there is an improvement in quality control. It further makes possible elimination of waste, since goods will no longer have to be discarded merely because there is a risk that they have approached their expiry; instead, whether or not a good has actually reached the end of its lifetime can be determined accurately from the monitoring device which accompanies it. In other words, the safety margin which must be used to ensure that the goods have not reached their expiry can be significantly reduced. Because the monitoring device can import the first data, its calculation can potentially take into account the whole history of the good, even the history before the monitoring device was present.

Alternatively, the good-specific characteristic may be an expected quality of the good which is not directly related to any defined expiry of the good. This option is particularly, but by no means exclusively, relevant in the case of goods which do not expire but rather "age", such as wine. In this case, the passage of time can actually lead to an improvement of the good under certain temperature conditions. Thus, the device may be used to indicate that the quality of the good has become sufficiently high for the good to be useful.

By virtue of the importing device importing data related to the exposure of the good to the environmental parameter in its prior life (this data may be previous values of the environmental parameter and/or a calculated good-specific value), information collected by one monitoring device may be passed over during a retagging procedure to a subsequent monitoring device. In this way it is possible to monitor substantially the complete lifetime of a perishable good and at the same time to re-tag such a good as needed or desired.

Note that a device for the detection of the dose rate and the accumulation of doses of photon radiation for the protection of human beings from hazardous radioactive radiation is disclosed in U.S. Pat. No. 5,173,609. The disclosed device includes a means to load the device with previous dosimetrical information of the bearer as well as a means to connect the device to an information process center. However, said document is silent with respect to monitoring perishable goods as well as the computation of a good-specific characteristic such as a remaining lifetime or an expected quality of such goods having regard to their monitored environmental parameter history.

The environmental parameter to which transported or stored goods are exposed may be of physical origin such as temperature, visible or non-visible photon radiation, charged or non charged particles, magnetic field, humidity, pressure, acceleration, or angular position. The environmental parameter may also be of chemical nature, such as a pH-value or substance concentrations. The parameter may also be biological such as a microbiological quantity. In principle the device is advantageous for monitoring all types of environmental parameters, it is particularly suited for temperature monitoring.

Also, the present invention may be used to monitor the effect on a good of a combination of more than one environmental parameters such as temperature and acceleration (shock and vibration), or temperature and humidity, or a combination of temperature, humidity and vibration.

The sensor means advantageously comprises at least one sensor placed right next to the good to be monitored to make sure that the measured quantity corresponds to the environmental parameter to which the good is exposed. There may be several sensors measuring the same environmental parameter at different places of the good. It is also possible that different sensors measure different environmental parameters at the same time.

The display may use visual or audio ways to output information. For example it may use a low energy consuming LCD (liquid crystal display), a photodiode, a beeper, or a loudspeaker. Preferably, in the case that the good-specific characteristic is expiry data of the good, the expiry data is displayed. With such a display it is clear for everybody that handles or uses the good whether the lifetime of the good has expired or not and whether use of the good is to be dissuaded.

Preferably, the monitoring device is disposable. For a broad application of environmental parameter monitors, their disposability is an important feature. If the monitoring device is too expensive and needs to be returned after transport, the expenses for monitoring the goods become too high in order to allow a broad application. Thus, the one time use of the device is important if its return is difficult or impossible to realize. Moreover, a product for one time usage is more tamper resistant as it may be programmed or hardware designed in a way that makes an external influence extremely difficult.

For this reason, the device preferably comprises a non-reversible on- and off-means (which may be a switch) for activating or deactivating the operation of the device. Such means increase the tamper resistance of the device, ensuring that once the monitoring is activated the goods are monitored without interruption. The deactivation means stops the monitoring; it has the function of providing a certificate or a document that freezes the status of the monitoring. For instance, if a product is transported by several carriers, a carrier may prove to another carrier that the product was handled correctly under his responsibility and the required storage or transportation conditions were maintained. On the other hand, the carrier knows from the display about the history of the environment to which the goods were exposed. In case of incorrect handling during prior transport or storage he may render report e.g. either to the producer or the receiver of the cargo. The non-reversible on- and off-means assure a high level of credibility of the monitoring system and make the monitoring results reliable.

The on- and/or the off-means may be a switch, which may be a push-button-type switch or alternatively may comprise an electric contact within a frangible portion. Once the electric contact of the switch is broken at the frangible portion, it is no longer possible to reconnect it. The frangible portion provides a non-reversible function.

Preferably, the computation does not use measured values from the whole of the period between the activation and deactivation of the device, since in that case the computation would include intervals within this period in which the user happens to know that the sensor means give an inaccurate value of the parameter. Such intervals may include: the time just after the device is activated and when it will usually only just have been attached to the good; the time just before the device is deactivated and when it may have be removed from the good; and any intermediate time during which the device is removed from the good, e.g. so that data can be output from it. For this reason, it is preferable if the user can perform an operation to ensure that in these interval(s), data from the sensor means is not included in the computation. This operation may be one performed by a separate switch, or alternatively it may be the operation of activating/deactivating the device using the on- and off means.

In fact, the concept provides a second, independent aspect of the invention, which is freely combinable with the first aspect and which can be expressed as an electronic device for accompanying a perishable good during one period to monitor the exposure of the good during that one period to at least one environmental parameter, the device comprising:

a) sensor means for generating data representing the exposure of the good to the at least one environmental parameter during said one period;
b) processing means for computing a good-specific characteristic at the end of said one period using said data;
c) output means for outputting the characteristic; and
d) interrupt means operable by a user to prevent the calculation using data generated during an interval within said one period.

The interrupt means may be the on- and off means; the operation of which actually defines the period. Alternatively, the interrupt means may be a separate interrupt means (e.g. switch).

In both the first and second aspects of the invention, the good-specific characteristic is preferably calculated from a good-specific correlation or function that describes the deterioration of the good in dependence on the environmental parameter. The deterioration function is found with tests and experiments establishing a correlation between the environmental history and the quality of the good. For many goods, the level of degradation can be calculated from a so-called Arrhenius equation, and accordingly the good-specific characteristic is preferably calculated using such an equation including good-specific numerical variables. In fact, monitoring a good using an Arrhenius equation provides a third independent aspect of the invention, which is freely combinable with the first aspect or second aspect.

According to this third aspect, the invention provides an electronic device for accompanying a perishable good during one period to monitor the exposure of the good to variable temperature during that one period, the device comprising:

a) sensor means for generating data representing the exposure of the good to temperature during said one period;
b) processing means for computing a good-specific characteristic at the end of said one period using the data and a good specific relationship given by an Arrhenius equation; and
c) output means for outputting the characteristic.

In all the above aspects of the invention, the processing means is preferably arranged to continuously update the good-specific characteristic "on the fly" based on the instantaneous output of the sensor means. Thus, at the end of said one period it will compute the good-specific characteristic at that time.

In the case that the processing means is arranged to operate "on the fly", then in principle it is possible for the device to operate without storing the output of the sensor means. However, more preferably in all aspect of the invention, the device preferably includes a memory for storing the output of the sensor means (here referred to as the "exposure history"), and preferably also any good-specific characteristic calculated on the fly. The continuous monitoring allows a user to trace back failures or deficiencies in the transport and/or storage history.

The data to be exported may include the exposure history and/or the good specific characteristic and/or other information related to the environmental parameter and the good. The history may also comprise the prior exposure history that was recorded by different monitoring system and imported to the monitoring device using the data import means. The prior exposure history may include information about the history of the good prior to the time when the sensor started the monitoring or even before the good was produced. For instance, if the goods are exposed to unusual environmental conditions during the production process, this information may be transferred to the computing device for computing the good specific characteristic. The prior history may include information gathered by another sensor at an earlier time and/or at a different location.

In a fourth aspect of the invention, freely combinable with the other aspects, proposes in general terms that the frequency of data storage in the memory is determined by the importance of the data.

Specifically, in this fourth aspect of the invention may be expressed as an electronic device for accompanying a perishable good during one period to monitor the exposure of the good during that one period to at least one environmental parameter, the device comprising:

a) sensor means for generating data representing the exposure of the good to the at least one environmental parameter during said one period;
b) memory means for recording data derived from the sensor means and representative of the exposure of the good to the parameter during said one period, and
c) output means for outputting the data;

said memory means being arranged to store the data at a storage frequency which is selectable from a plurality of non-zero values, the storage frequency for any section of the data being selected based on the corresponding measured value of the environmental parameter.

For example, the sampling for measuring the environmental history is usually performed at given time-steps triggered by an oscillator, e.g. a clock, and the storing of measured values, e.g. the rate of storing measured values and correspondingly selection of measured values to be stored, may be chosen to such that there is a higher frequency of recordings at times when the measured values of the environmental parameter indicates that they are of particular importance.

Alternatively, but less preferably, the sampling itself may be at a selectable frequency, which in turn determines the frequency at which the memory means stores the data (e.g. if the memory means stores all, or at least a constant proportion, of the data generated by the sensor means).

Note that preferably the memory means stores data throughout said one period, i.e. the storage is always being carried out at some non-zero storage frequency.

However, in less preferred embodiments, it is possible for the memory means to cease to store data completely during certain selected intervals, e.g. an interval initiating by an interrupt means. In other words, in addition to the plurality of non-zero values, the memory means may also be arranged to cease to store data during such selected intervals (i.e. with a frequency of zero).

Each of the aspects of the invention may alternatively be expressed as a method of using a device for monitoring a perishable good.

With the method it is possible to monitor the life history of products or goods from the very beginning on such as from the time of their production or even earlier, up to the time when they are used by the end-user.

Under certain circumstances it is useful not to display all of the essential information about the good to everybody. In such cases the information may simply be not shown on the display or may be encrypted. With a particular access, however, this information is provided to an authorized person. Parts of the information about the status of the goods may only be accessed by an authorized person.

Optionally, an identification number may be attributed to each monitoring device. With such an identification number the monitoring device is individualized and the transport route of each good can be traced back. With this individualization together with a data transfer of the information about the environmental history to an external data system, not all information about the environmental history needs to be passed from a preceding monitoring device onto the following monitoring device. This helps to save memory space in the monitoring device. The entire transport and/or storage line can be recovered from the data associated with the identification number that is stored in an external data system.

BRIEF DESCRIPTION OF THE FIGURES

An embodiment of the invention will now be described in detail, and for the sake of example only, with reference to the following figures in which.

DETAILED DESCRIPTION OF THE EMBODIMENT

Figure 1:
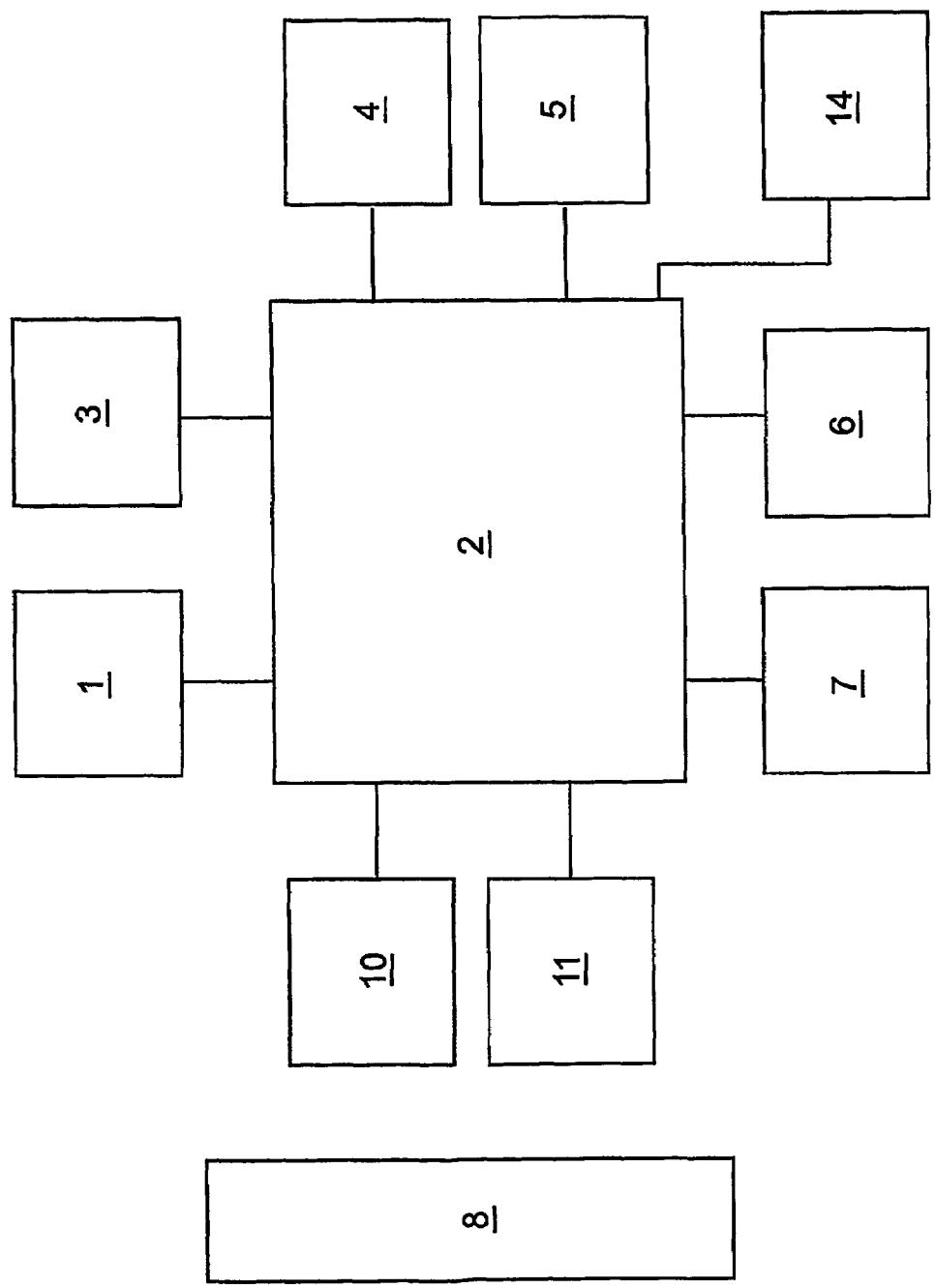
FIG. 1 is a schematic view of a device which is a preferred embodiment of the invention, and which is suitable for accompanying a perishable good during a period of its life.

FIG. 1 shows a block diagram of a preferred device 9 (illustrated in a physical embodiment in FIG. 2) according to the invention for accompanying a perishable good during a period of its life. The device 9 has a processing device 2, which is connected to a sensor device 1 that detects for instance with a temperature sensor the temperature of a good. Preferably, the sensor device 1 is closely located at the good to be monitored. The processing device 2 uses a microprocessor for e.g. calculating an expected remaining life time of the good. It is connected to a memory device 3 which records the data which is processed by the processing device 2 from the temperature measured by the sensor device 1.

The processing device 2 is also connected to an on-switch providing a non-reversible function 10 and an off-switch 11 providing a non-reversible function. With the non-reversible on-switch 10 the measurement is activated. The measurement cannot be interrupted until the non-reversible off-switch 11 is switched which ends the operation of the monitoring. An oscillator or clock 7 provides processing device 2 with the time variable, triggering the sampling of the measurement.

A data import device 6 and a data export device 5 both use a radio antenna for establishing a connection to an external data system 8 for exchanging information. Both are connected to the processing device 2. With help of the external data system 8, information about the environment of times before the sensor device 1 started its measurement is fed into the device 9. Information that the external data system 8 may transmit to the device 9 can include information gathered during the production process of the good, by other devices that measured the environmental parameter in a prior time period, and/or by additional devices that are located at different places around the good.

The display 4 and the export device 5 together constitute the output of the device 9. The display 4 preferably displays (in some form) a result of the calculation of the characteristic of the good performed by the processing device 2. The display may also be used to display information concerning the exposure history, such as the exposure history itself or portions thereof, thresholds or any other desired information. The information output from the device 9 via the export device 5 may include the results of the calculation performed by the processing device 2 and/or accumulated measurements from the sensor device 1 stored in the memory 3. It may be advantageous to provide an encryption of information output.

The data import device 6 and the data export device 5 are here designed to be suitable for remote transmission of data, generally using electromagnetic (normally radio) signals, though other signals such as sonic signals might in principle be considered. The remote transmission allows the user with help of antennas to gather information about an entire batch of goods without needing to physically touch each single good. For instance an complete truckload may be checked simultaneously when the truck approaches the external data system 8. Immediately all relevant information about the status of the goods is available. The display 4 offers an direct access to essential information about the good such as the expected level of quality and/or the expected remaining life time. Thus no sending of a logger, a disc or other information carriers is necessary any more for evaluating the exposure history. Instead the good-specific characteristic is calculated right on the spot. In case the expected remaining life time expired, the direct access allows a simple, quick and reliable trace back of the deficiencies during transport or storage.

Note that in other embodiments one of both of the devices 5, 6 may alternatively or additionally be designed to comprise an electronic interface for electronic transmission of data to/from the device 9.

The device 9 further comprises an electric power supply (not shown) for providing electric power to the processing device 2, the memory device 3 and the display 4. The electric power supply may be a battery or an accumulator. It may also contain an antenna or a solar cell for picking up ambient radiation or light for feeding the accumulator or a capacitor.

Figure 2:
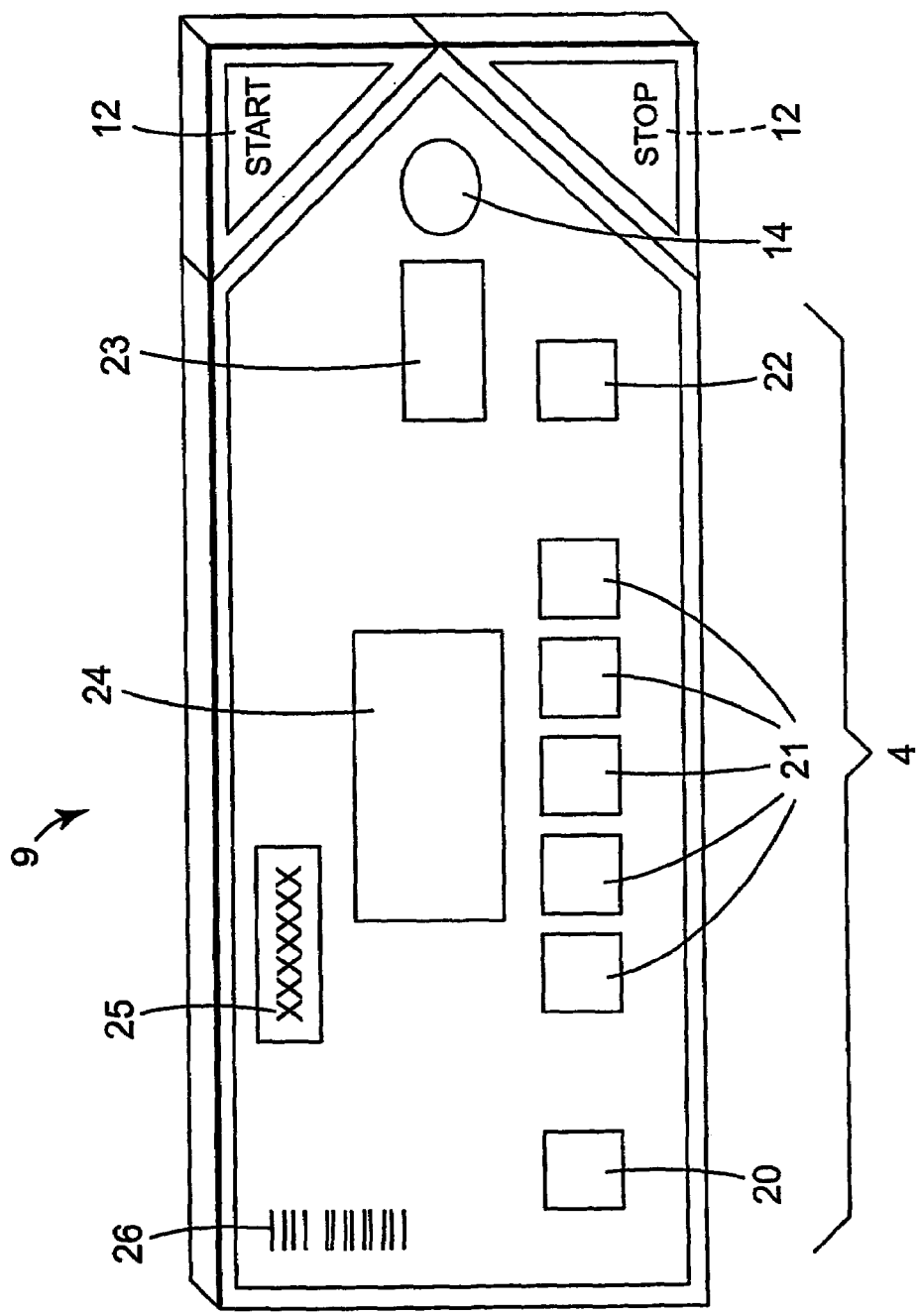
FIG. 2 is a perspective view of the device of FIG. 1.

As shown in FIG. 2 (a perspective view of the device shown in FIG. 1 and using the reference numerals used in FIG. 1 when appropriate), the device 9 has the form of a plastic mold in the shape of a credit card. A display 4 shows selected portions of relevant data to anyone it may concern. The display 4 displays the remaining life time of the good and/or the expected quality of the good after it has been subjected to the influence of the environmental parameter. With help of the display 4 it is easy to determine whether the quality of the good is still expected to be okay or not and/or the remaining life time is expired or not. The display 4 may also indicate the time when the good was exposed to an unacceptable or an extreme environmental parameter. The display may also provide general status information as well as alarm or alert information as desired. A bar code (26) at the device 9 and/or an electronic identification number helps to identify the good and/or the individual device 9.

With help of a non-reversible on-switch 10 the operation of the monitoring device 9 is activated. With help of a non-reversible off-switch 11 the operation of the device 9 is deactivated. As shown in FIG. 2, the on-/off-switches 10, 11 may each comprise a respective frangible portion 12, which is broken to transmit a signal to the respective switch, so that a non-reversibility is assured. Once the non-reversible on-switch 10 is activated, the operation of the monitoring is performed up to the time when the frangible portion 12 of the non-reversible off-switch 11 has been broken off. As shown in FIG. 2, each of the frangible portions 12 may be a respective corner of the device 9. Alternatively, the on-/off-switches may be push-button types of switches.

The device 9 (FIG. 1) further includes a switch 14 which is operable by a user to indicate that there should be a short interruption of certain operations or computations of the device. Specifically, for a short interval (e.g. 1 to 5 minutes) data from the sensor device 1 is ignored, e.g. not employed by the processing device 2 e.g. in computations relating to a good-specific characteristic. Although not preferred, the data from the sensor device may not even transmitted to the memory device 3. Preferably the data is transmitted to the memory device and more preferably marked, such that it can be identified as data generated during an interrupt interval. At the end of said interval the device returns automatically to normal operation. Exactly when the short interval is located during the period monitored by the device 9 depends upon the point within the period when the switch 14 is operated. It may for example be an interval centred at the moment when the switch 14 is operated, or an interval beginning or ending with the moment when the switch 14 is operated. Thus, by operating the switch 14 a user is able safely to handle the device 9 without corrupting computations e.g. relating to a good-specific characteristic, level of abuse, etc., or, if desired, data which will subsequently be output via the export device 5 and/or the display 4.

Referring to FIG. 2, the display 4 includes a (e.g. LCD) display 24 for displaying a good-specific characteristics and/or to other information relating to the exposure history. The display 4 may also include other indicators for alarm or alert-type displays 20, 21, 22 and 23. Indicator 20 displays a signal in the case that the sensor device 1 (not shown in FIG. 2) senses an environmental parameter, e.g. temperature, below a defined lower threshold, while indicator 22 displays a signal in the case an environmental parameter value above a defined upper threshold is measured. A number of the indicators 21 are lit to indicate for how long since the start of monitoring, the good has been exposed to conditions exceeding a user-defined limit (an upper and/or lower as the case may be). Indicator 23 displays a signal in the case that the processing means 2 has performed a calculation, which indicates that the good has expired. The device may include an area 25 for carrying written data or indicia, and a barcode 26 for carrying such information.

The housing of the device 9 is preferably a water-tight container with a volume of less than 36, more preferably less than 26, even more preferably less than 21, most preferably less than 16 cubic centimeters. It may include attachment means for attaching the device 9 to a good (such as adhesive, hook(s), hook and loop-type fasteners, portions configured to slide into holders on the good, or holders for receiving such portions provided on the good). The monitoring system may thus be easily attached to products or goods without excessive volume or weight.

Figure 3:
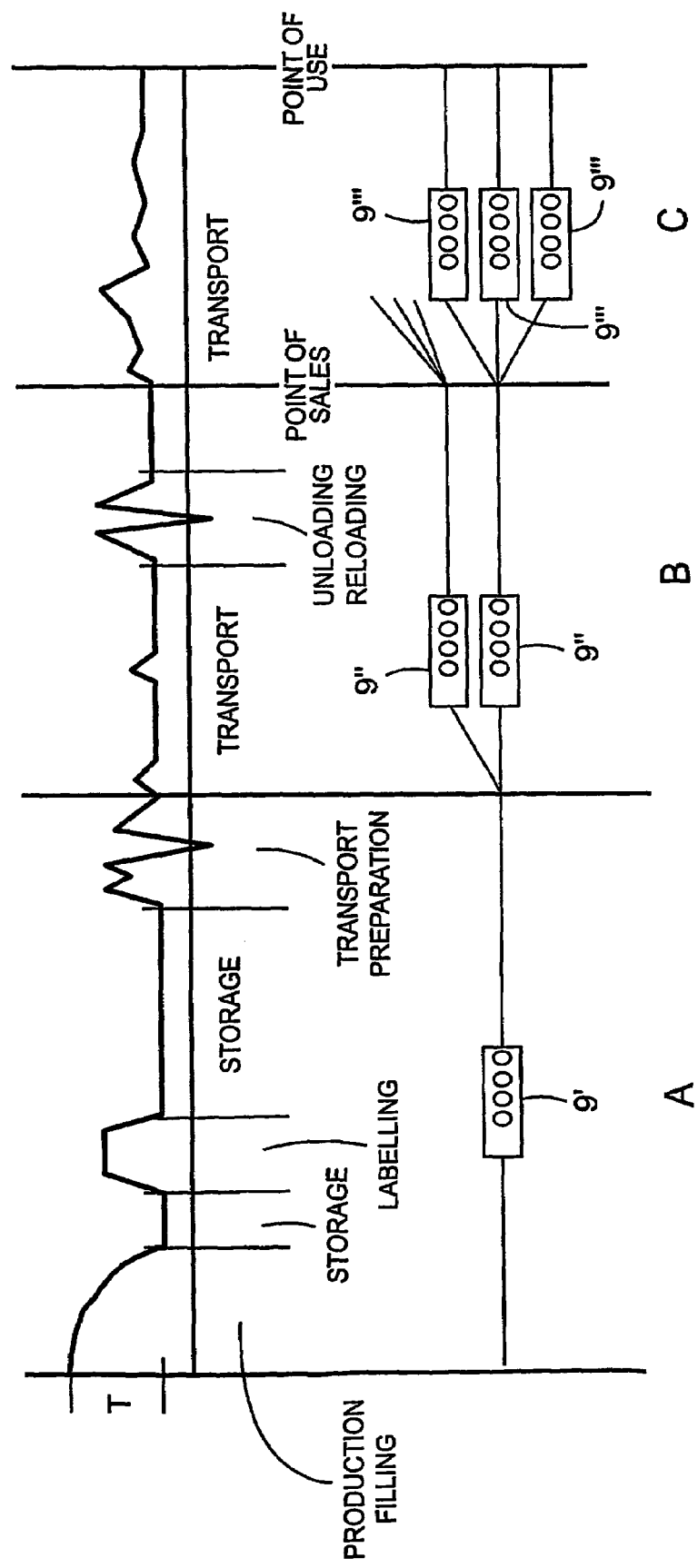
FIG. 3 is a graph showing a environmental history to which a good has been subjected.

FIG. 3 shows a temperature profile versus time to which a good, here for example a vaccine, is exposed. The temperature is already monitored during the production and filling. During storage the temperature is low. During labelling, unloading, reloading and at certain times during transport the temperature rises. In period A, the vaccine is stored and transported as a batch, which is monitored by one device in accordance with the invention (9'). In period B, the batch of vaccine is subdivided into two e.g. large transport packages, each of which is monitored by a single device in accordance with the invention (9"). Each of these devices include imported data from the monitored exposure of the vaccine during period A. In period C, the packages are further split up into smaller shipping units with sizes that correspond to their final use. Again each shipping unit is monitored individually up to the time of use and each monitoring device (9''') includes imported data from the monitored exposure of the vaccine during periods A and B. Thus, the devices and the method for monitoring the environmental parameter (e.g. temperature) allow the expected remaining life time of the good and/or an expected quality to be calculated with high accuracy by including the information gathered by monitoring of the good essentially over its entire life time.

Figure 4:
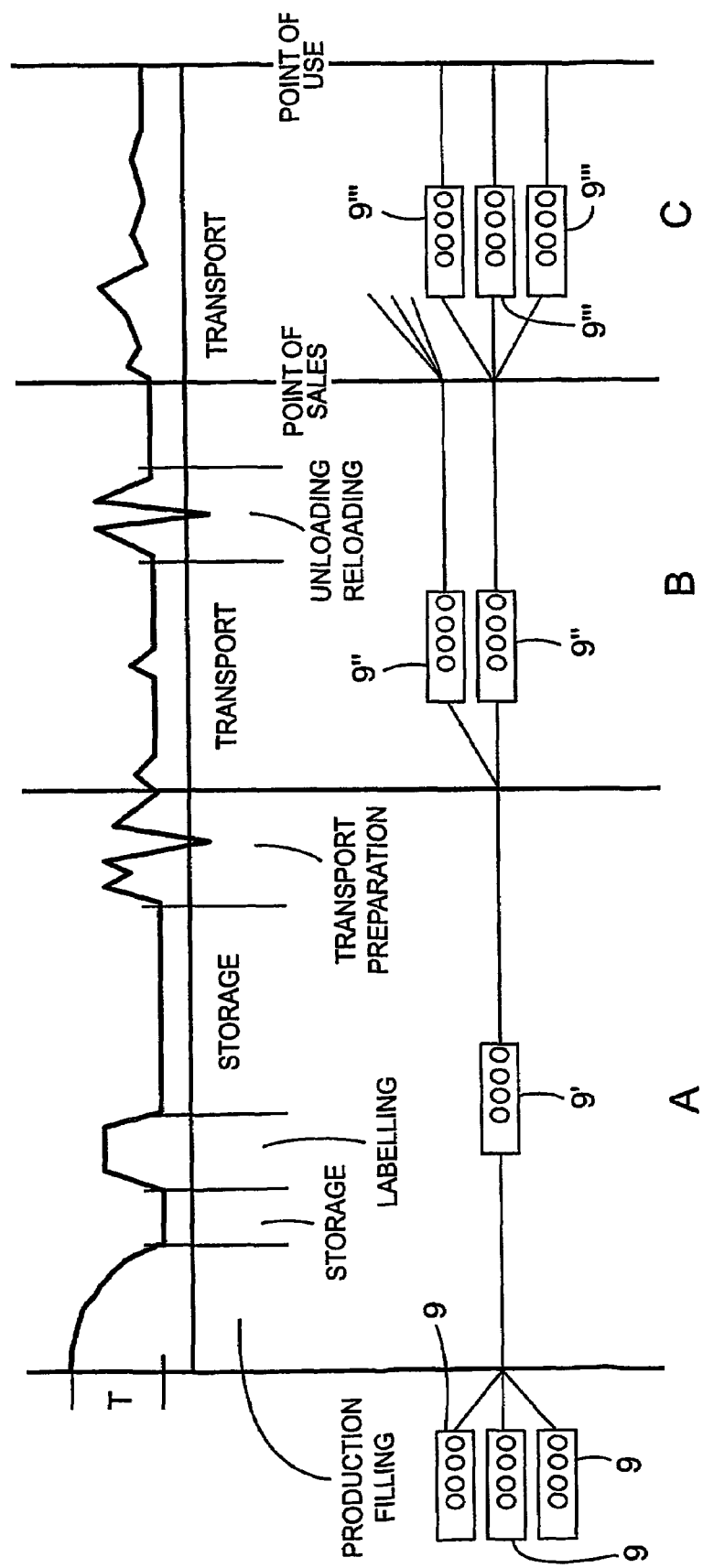
FIG. 4 is a variation of FIG. 3.

FIG. 4 illustrates that devices may be advantageously used to monitor the raw materials from which a good is produced during a period before the production of the good (period A). Such monitoring can be advantageous, when for example the exposure history of a raw material or component, used to produce a particular good, has an effect on its good-specific characteristic (e.g. its expiry characteristic or quality characteristic). As illustrated in FIG. 4 three components, used in the production of a good are monitored using respective devices in accordance with the invention (9). The outputs from these three devices are transmitted to the device 9', which is used to monitor the good during the period A.

We now discuss the functionality of the processing device 2.

A first preferred function of the processing device 2 is to ensure that legal specifications (which are normally expressed in terms of good-specific maximum/minimum thresholds, e.g. threshold temperatures) in regard to environment parameter have been met. This means that the processing device 2 should be capable of verifying that during the monitored time, there are no critical time intervals in which the maximum/minimum environmental parameter, e.g. temperature, limits are exceeded. For example, some products suffer harm when the temperature drops below a particular temperature, e.g. 0° C. So in this case if the sensor 1 detects a temperature below said minimum threshold the processor 2 should preferably (i) detect the event, (ii) make a decision as to the result of the event on the good (i.e. to output a good-specific characteristic indicating that due to the event the good is outside the legal specification defined for this type of good), and (iii) store the event for back tracking.

A second preferred function is to calculate good-specific characteristics such as quality/expiry properties during the active period of the device 9. In general, the device is inputted with a correlation or function, which allows the computation of the good specific characteristic or characteristics. For example, a correlation of an environmental parameter and degradation can be inputted based on a relationship determined experimentally. In particular the specific degradation relationship for a particular good to a particular environmental parameter can be inputted. Also a number of functions exist for modelling degradation relationships including Arrhenius, Weibull, Eyring or Belehradek type functions.

Figure 5:
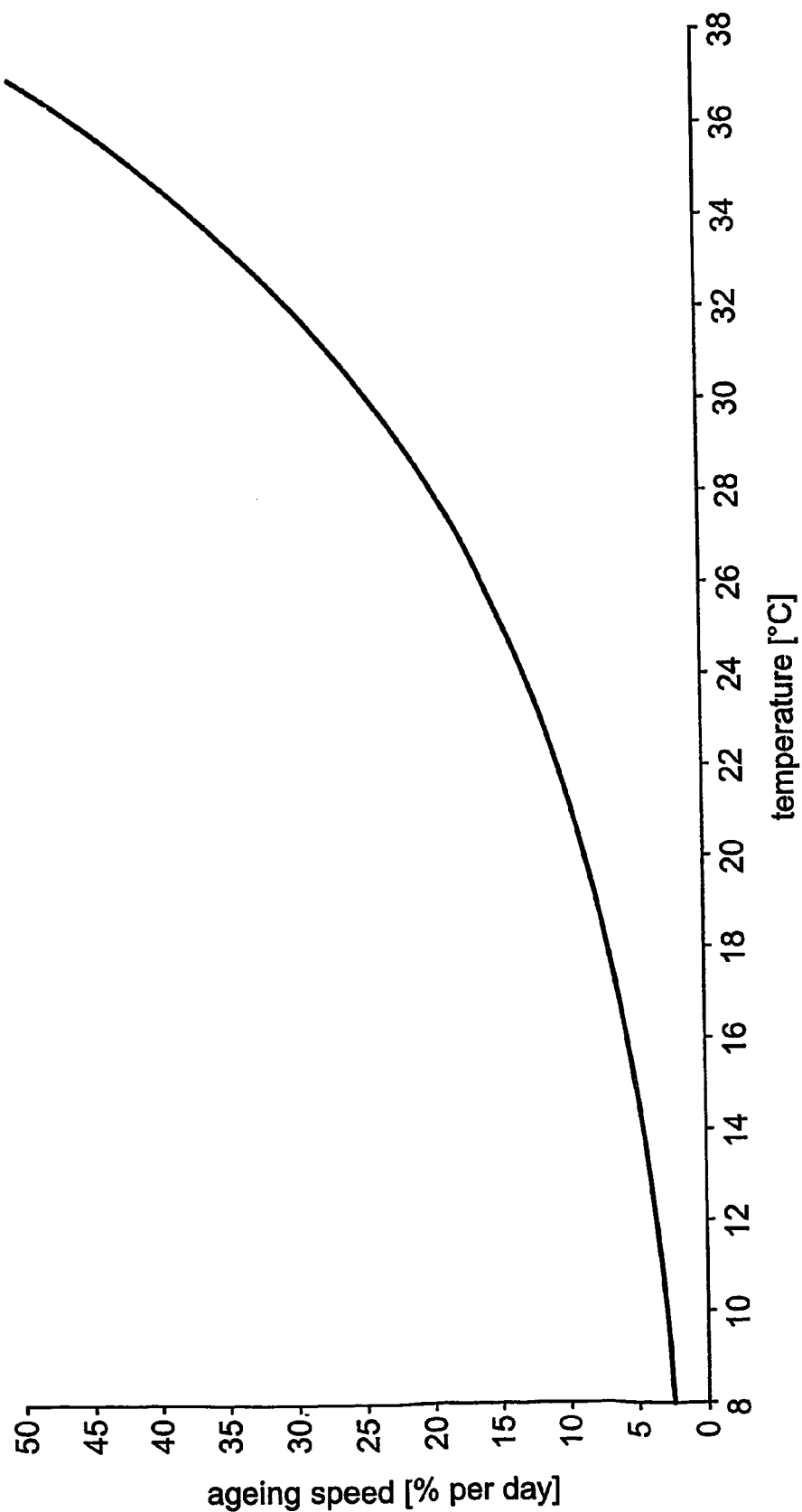
FIG. 5 shows a relationship between temperature and degradation for a polio vaccine.

Many products have a degradation relationship given by an Arrhenius equation having the form illustrated in FIG. 5, illustrating the degradation relationship (e.g. ageing speed) of a polio vaccine with respect to temperature. In FIG. 5 the horizontal axis gives temperature and the vertical axis gives the ageing speed in percent per day. The inset to FIG. 5 indicates the resultant number of days it will take for substantially the complete vaccine to be degraded, for each of the given temperatures.

Because the Arrhenius equation describes the behaviour of many products, the processing device 2 is preferably adapted to compute the characteristic by employing a function based on an Arrhenius equation. In applying the Arrhenius equation in regard to a temperature-sensitive good (e.g. ageing speed=$1/e^{(a+b(temperature))}$), besides a knowledge of the good-specific constants, e.g. a and b, a knowledge of the temperature over time and, if necessary, degradation starting conditions are inputted. This is a more accurate way to predict a good-specific characteristic than simply to watch limiting temperature values and maximum time values as discussed above. Preferably, the processing device 2 calculates the characteristic "on the fly", i.e. continuously (or at short, preferably equal, intervals) during the monitoring period. Desirably the characteristic is correspondingly continuously outputted, providing the user a continuously updated status of the good characteristic.

A third preferred function is storage of the environmental parameter, e.g. temperature, history. In known data loggers the storage is performed as a continuous storage of measured values at fixed time intervals. Because maximum logging time is a function of the storage capacity of the data logger, the fixed time interval must be preselected before the start of the application. For example, for monitoring a shipment over a period of 30 days with a data logger having a storage capacity of 10,000 logs, a time interval of 5 minutes would be typically applied. Thus there is a compromise between logging duration and the density of sampling. Moreover any potentially detrimental event occurring during the interval between two measurements will be missed. In contrast, the present embodiment automatically adapts the rate at which the memory is used up (frequency of storage) according to the importance of the measured values. Such a storage function advantageously allows a sensing or measuring of the environmental parameter at the highest rate possible (i.e. with the shortest possible time interval) for a particular device, while keeping the consumption of memory to a minimum by recording only certain measured values in accordance to the defined importance. This results in a reduced amount of data storage, yet allows the storage of data that are needed to give an accurate determination of characteristic(s) of the good. This also allows for a more precise monitoring (due to short sampling intervals) and a maximum of monitoring time for a particular device with a particular storage capacity. Moreover monitoring time can be typically greatly increased without having to implement more costly and/or larger, voluminous storage units. Also the reduced amount of data storage in turn significantly reduces the work, which is required to subsequently evaluate the data, resulting in lower power consumption and a reduced time for the data transfers and/or analysis.

In a preferred embodiment, the importance of data values is defined as the degradation speed for example as determined by an Arrhenius function.

As mentioned above, typically sensing or sampling of the environmental parameter is performed with the shortest time interval possible for the particular device. After each sampling, product degradation or ageing speed (e.g. according to the second function of the processing device 2 described above) is computed. Based on the ageing speed, the storage interval of the measured values is defined (with appropriate measured values being stored accordingly). In other words, the interval of storage is given by the value of the ageing speed. The higher the ageing speed the shorter the interval of storage (approaching or becoming equal to the interval of the sampling).

Figure 6:
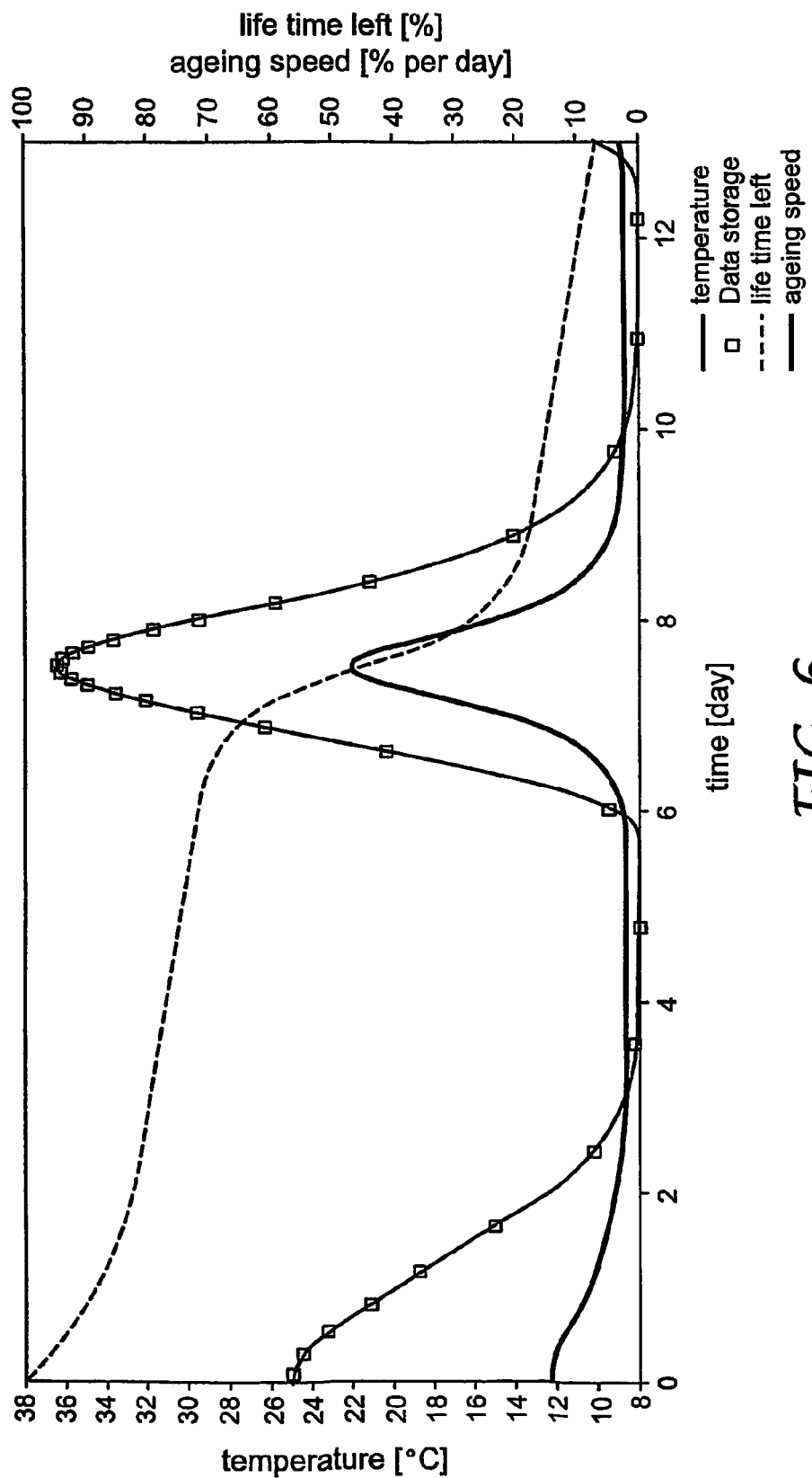
FIG. 6 shows a monitoring method used e.g. by the device of FIG. 1.

This is illustrated in FIG. 6, in which the horizontal axis indicates time. A first line (having a peak at about 7 days) indicates the temperature with reference to the left vertical axis of the graph. A second line (also having a peak at about 7 days) indicates the ageing speed. This good-specific characteristic is calculated according to an Arrhenius equation as described above, making use of good-specific parameters. This good-specific characteristic is used to derive a third line (decreasing from left to right across FIG. 6 with reference to the right vertical axis of the graph) which indicates the remaining lifetime of the good, a second good-specific characteristic. The squares on the first (temperature) line in FIG. 6 indicate the time-points at which measured values are stored. As can be seen in FIG. 6, the (time) interval between storage points decreases, i.e. the frequency of storage increases, with higher ageing speed. (It should be noted that for ease in viewing, the number of stored data points depicted in FIG. 6 is very much lower that what would used in reality.)

As mentioned above, such a storage function allows for a reduction in amount of stored data. For example, a possible recording rate could be to make one storage for every 0.1% of degradation. This would lead to a theoretical, necessary storage capacity of 1000 measurements for 100% degradation. In practice for such a situation typically more measurements would be defined to be recorded for a number of reasons, e.g. for enhanced accuracy or monitoring beyond expiry, and even if the number of stored measurements is doubled (e.g. 2000) this represents a low storage capacity.

Figure 7:
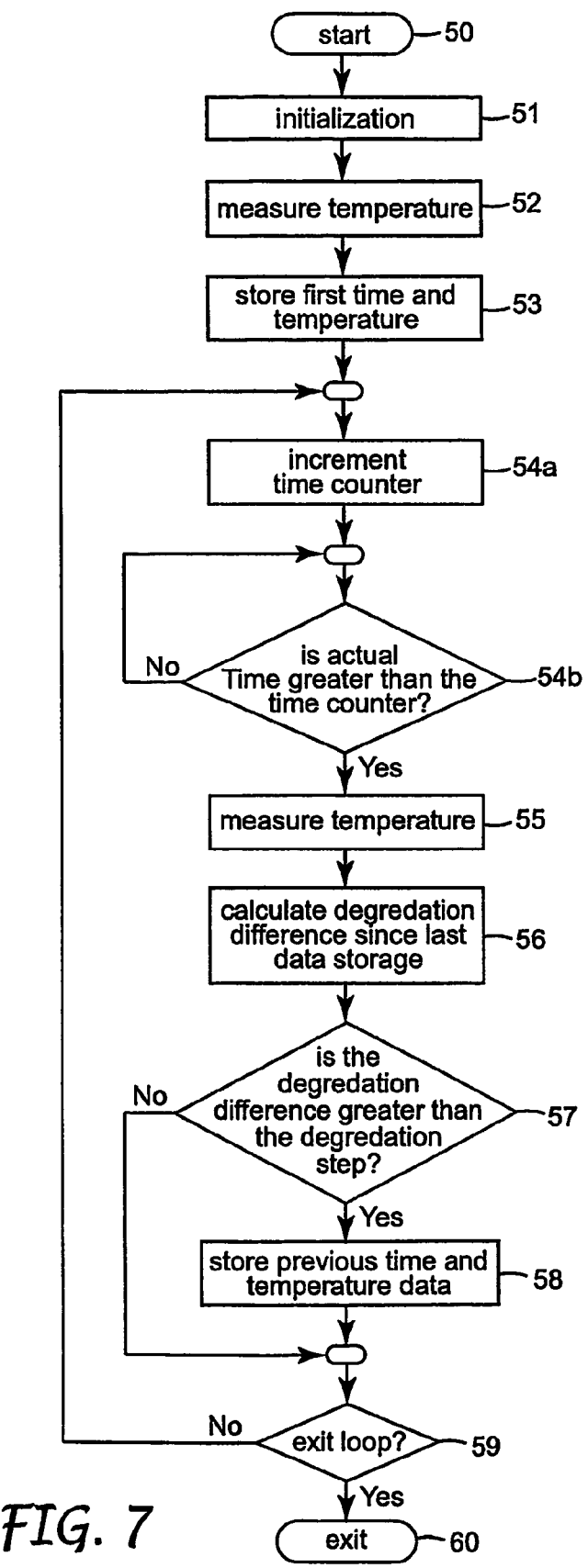
FIG. 7 is a flow diagram illustrating a control logic for controlling a memory.

In a more specific embodiment, the time interval between two stored measurements is preferably in a range, such that the calculated degradation based on the correspondingly measured environmental parameters does not exceed a defined degradation step. Preferably the degradation step is defined to be 0.002 or lower, more preferably from 0.001 to 0.00005, most preferably from 0.0005 to 0.00008. If the integral of the actual degradation based on the latest measured environmental parameter is greater than the sum of the degradation value at the last stored measurement value and degradation step, then the previous measured parameter value/time (just before the latest measurement) is to be stored. If aforesaid actual degradation is less than the aforesaid sum, the system proceeds to evaluation of the next measurement. FIG. 7 shows a flow diagram illustrating a method (control logic) for such memory/storage control for a monitoring device. In general, the method starts at a step 50, with an initialisation (step 51), with the first environmental parameter, here e.g. temperature, measurement being received from the temperature sensor (step 52) and storing the first measured temperature and time (step 53). In next two steps (54*a* and *b*), a time synchronization is typically performed in preparation of the upcoming measurement. Temperature is measured (in step 55) and the degradation difference since last data storage is calculated (step 56). In step 57, it is determined whether the degradation difference since the last data storage is greater than the degradation step. If not (and if there is no reason to exit the loop (step 59)), the method returns to the start of the loop (here step 54*a*). If so, the time and temperature of the immediately previous measurement is stored in step 58. After such storage (in step 58), again if there is no reason to exit the loop (step 59), the method returns to the start of the loop.

In a further level of sophistication in regard to economical storage of environmental parameter/time history, the time interval between successive storages may be advantageously selected from a series of pre-defined intervals, in which the shortest interval is preferably equal to the sensing/sampling interval. The series preferably has from 8 to 128 members, more preferably 12 to 128, even more preferably 12 to 64 and most preferably 16 to 64 members. By using such a limited number of possible time intervals between stored measured values, the storage capacity necessary for recording the time at which a particular recorded measurement was taken can be significantly reduced, because said time information can be achieved by recording which predefined time interval was used rather than the actual time e.g. in seconds. Because the ageing speed is generally expected to vary logarithmically in relation to the environmental parameter, e.g. temperature, it is advantageous to select from an approximately logarithmic series of defined time intervals for storage. For example, when applying a sensing/sampling rate of 1 sensing per second, a suitable series of defined time intervals for storage may be as follows: 1, 2, 5, 10, 20, 60, 120, 300, 600, 1200, 3600 and 7200 seconds. Also when applying such series of defined time intervals for storage, it is preferred that the time interval between two stored measurements are in a range such that the calculated degradation based on the correspondingly measured environmental parameters does not exceed a defined degradation step (as given above). In this case, if the integral of the actual degradation based on the latest measured environmental parameter is greater than the sum of the degradation value at the last stored measurement value and degradation step, then the previous measured parameter value/time having the appropriate time interval to the last stored data is to be stored. In other words, the control is similar to that shown in FIG. 7, but in step 58, the time/temperature data stored is the last preceding time and temperature measurement data, such that the interval between that time and the preceding storage is one of the defined intervals.

To further improve compression of the storage of the monitored environment parameter (in particular temperature) values, the storage is preferably made in terms of the difference between the values of successive measurements, rather than absolute values. For example, because the temperature changing speed is often slow in comparison to the sampling time, we have found that storing temperature differences with a linear scale is an economical method of storage compression.

In another preferred embodiment, the importance of data values is defined by the absolute value of the monitored environmental parameter itself. This can be, for example, advantageously applied in monitoring devices in which a good-specific characteristic, such as ageing speed, is not (continuously) computed. Specifically having regard to the sensitivity of the good to the monitored environmental parameter and the value of the measured environmental parameter upon sampling, the storage interval of the measured values is defined. For example, for a good sensitive to heat, the higher the measured temperature the shorter the interval of storage (approaching or becoming equal to the interval of sampling).

In yet another desirable embodiment, the importance of data values can be defined by the rate of change of the monitored environmental parameter, wherein the frequency of storage is given by the absolute slope of the environmental parameter versus time curve.

As noted above, the switch 14 can be operated to exempt a short time interval (e.g. 1 to 5 minutes) from computations (e.g. like those shown in FIG. 6). This means that the results of such computations will not be corrupted by any event sensed by the device occurring in this interval, e.g. high temperatures after the device is separated from the good stored in a cold box in order to take a reading.

Because, at the activation time, the sensor device may give an incorrect reading of the temperature of the good, the processing device 2 may be desirably configured such that initial activation of the device likewise exempts a short time interval from computations (e.g. like those shown in FIG. 6). For example, operation of the on-switch 10, defining the start of the monitoring period can be configured to allow computations to begin after a defined interval (e.g. 1 to 5 minutes), or alternatively when the temperature reaches a particular user-defined value.

Similarly, at the end of usage of the device 9, the user may separate the device 9 from the good, so that the output of the sensor device 1 does not correspond to the true environmental parameter to which the good is exposed. Thus, the device may be arranged such that operation of the off-switch 11 (thus defining the end of the monitoring period) causes measurements made during an immediately preceding interval (for example 1 to 5 minutes) to be discarded, i.e. not used in computations Although the invention has been described above with reference to a single embodiment, many variations are possible within the scope of the invention as will be clear to a skilled reader.

For example, although the switches 10, 11, 14 are indicated on FIG. 1 as being physically in contact with the device, they may in fact be remote from it and in contact with it via a remote signally system (e.g. by radio). Furthermore, any of the switches (particularly the start switch) can be automatically triggered based on an environmental parameter (e.g. the one measured by the sensor device 1). For example, the device 9 may have a sleep mode, and be "woken" from the sleep mode by the start switch 10 reacting to an external effect which may be the user operation but which may alternatively be a change in an environmental parameter (e.g. it getting dark) measured by the sensor device 1 or another sensor.

Also, although the embodiments described in detail above often relate only to the single environmental parameter of temperature, the invention is not limited in this respect. Rather a plurality of environmental parameters may be taken into account, and for example used to generate a single characteristic indicating the cumulative degradation of the good due to all of them.

With the device it is also possible to determine a level of "abuse" of the good, which is calculated based on measured environmental parameter values exceeding a user-defined limit. The limit (which may be an upper and/or lower limit as the case may be) is typically selected having regard to the sensitivity of the particular good or goods to the particular environmental parameter being monitored and/or defined optimal storage conditions for said good. For example, for a good sensitive to heat and in which optimal storage conditions are below 5° C., any measured exposure to temperatures above 5° C. can be considered to be an "abuse" and the corresponding measured exposures would used in calculating said level of abuse.

The level of abuse may be calculated by summing the time at which the good was exposed to an environmental parameter exceeding said limit and dividing said sum by the total time to give a percent exposure outside said limit as a quantity of level of abuse.

Alternatively the level of abuse can be calculated by weighting measured parameter values exceeding said limit with a coefficient and summing up all coefficients. The weighting is determined by the magnitude of the measured environmental parameter. The weighting scheme applied is desirably selected having regard to the sensitivity of the particular good or goods to the environmental parameter being monitored and/or the magnitude of the difference between measured parameter value and the limit.

The invention claimed is:

1. An electronic device for accompanying a perishable good during one period to monitor the exposure of the good during that one period to at least one environmental parameter, the device comprising:
    a) data import means for importing first data representing the exposure of the good to the at least one environmental parameter during an immediately preceding period;
    b) sensor means for generating second data representing the exposure of the good to the at least one environmental parameter during said one period;
    c) processing means for computing a good-specific characteristic at the end of said one period using the first and second data and a good-specific relationship between the characteristic and the parameter; and
    d) output means for outputting the characteristic.

2. A device according to claim 1 in which the output means comprises display means for displaying the characteristic to a user.

3. A device according to claim 1 in which the output means comprises means for exporting the characteristic as an electronic or electromagnetic signal.

4. A device according to claim 1 in which the characteristic is a quality characteristic indicative of the expected quality of the good after the exposure represented by the first and second data.

5. A device according to claim 1 in which the characteristic relates to the expiry of the good.

6. A device according to claim 5 in which the characteristic is an expected expiry date or remaining life-time of the good.

7. A device according to claim 1 in which the sensor means is for measuring temperature, and the good specific relationship is given by an Arrhenius equation.

8. A device according to claim 1 further comprising memory means for recording third data derived from the sensor means and representative of the exposure of the good to the parameter during said one period, and in addition to the characteristic, the output means outputs said third data.

9. A device according to claim 8 in which the third data is equal to the second data.

10. A device according to claim 8 in which the memory means is operative to store the third data at a frequency which is selectable from a plurality of non-zero values, the storage frequency for any section of the third data being selected based on the corresponding measured value of the environmental parameter.

11. A device according to claim 1 including interrupt means operable by a user to prevent said computation using data generated during an interval within said one period.

12. An electronic device for accompanying a perishable good during one period to monitor the exposure of the good during that one period to at least one environmental parameter, the device comprising:
    a) sensor means for generating data representing the exposure of the good to the at least one environmental parameter during said one period;
    b) processing means for computing a good-specific characteristic at the end of said one period using said data;
    c) output means for outputting the characteristic; and
    d) interrupt means operable by a user to prevent the calculation using data generated during an interval within said one period.

13. An electronic device for accompanying a perishable good during one period to monitor the exposure of the good during that one period to at least one environmental parameter, the device comprising:
    a) sensor means for generating data representing the exposure of the good to the at least one environmental parameter during said one period;
    b) memory means for recording data derived from the sensor means and representative of the exposure of the good to the environmental parameter during said one period, and
    c) output means for outputting the data;
said memory means being arranged to store the data at a storage frequency which is selectable from a plurality of non-zero values, the storage frequency for any section of the data being selected based on the corresponding measured value of the environmental parameter.

14. An electronic device for accompanying a perishable good during one period to monitor the exposure of the good to variable temperature during that one period, the device comprising:
    a) sensor means for generating data representing the exposure of the good to temperature during said one period;
    b) processing means for computing a good-specific characteristic at the end of said one period using the data and a good specific relationship given by an Arrhenius equation; and
    c) output means for outputting the characteristic.

15. A device according to claim 1 further comprising non-reversible on- and off means for respectively activating and de-activating the device.

16. A device according to claim 15 in which the on- and off-switches comprise respective frangible portions including electric contacts, breakage of the respective frangible portions respectively activating and de-activating the device.

17. A method for establishing a good-specific characteristic of a perishable good during one period during which the good is exposed to at least one environmental parameter, the method comprising:
    a) importing first data representing the exposure of the good to the at least one environmental parameter during an immediately preceding period;
    b) generating second data representing the exposure of the good to the at least one environmental parameter during said one period;

c) computing a good-specific characteristic at the end of said one period using the first and second data and a good-specific relationship between the characteristic and the parameter; and d) outputting the characteristic.

18. A method for recording data indicative of the exposure of a perishable good during one period to at least one environmental parameter, the method comprising:

a) generating data representing the exposure of the good to the at least one environmental parameter during said one period;

b) computing a good-specific characteristic at the end of said one period using the data; and c) outputting the characteristic;

the method further including registering a predefined operation performed by a user within said one period, and upon this registration preventing the computation using data generated during a corresponding interval within said one period.

19. A method for recording data indicative of the exposure of a perishable good during one period to at least one environmental parameter, the method comprising:

a) generating data representing the exposure of the good to the at least one environmental parameter during said one period;

b) recording the data; and c) outputting the data;

the recordal of the data being performed at a storage frequency selected from a plurality of non-zero frequencies based on the corresponding measured value of the environmental parameter.

20. A method for establishing a good-specific characteristic of a perishable good during one period during which the good is exposed to variable temperature, the method comprising:

a) generating data representing the exposure of the good to temperature during said one period;

b) computing a good-specific characteristic at the end of said one period using the data and a good specific relationship given by an Arrhenius equation; and c) outputting the characteristic.

21. A system for monitoring the exposure of a perishable good to at least one environmental parameter, the system comprising:

a) monitoring means for monitoring the exposure of the good during one period of its life;

b) an electronic device according to claim 1; and c) means for transmitting data generated by the monitoring means to the data import means of the electronic device.

* * * * *